United States Patent
Roberto Gomes et al.

(10) Patent No.: US 12,173,240 B2
(45) Date of Patent: Dec. 24, 2024

(54) CATALYSTS AND SELECTIVE PROCESS FOR THE PRODUCTION OF RENEWABLE AVIATION FUELS AND BIOFUEL PRODUCED

(71) Applicant: Petróleo Brasileiro S.A. - Petrobras, Rio de Janeiro (BR)

(72) Inventors: Jefferson Roberto Gomes, Rio de Janeiro (BR); Jose Luiz Zotin, Rio de Janeiro (BR); Rodrigo Caetano Chistone, Rio de Janeiro (BR); Anilza De Almeida Lyra Correa, Rio de Janeiro (BR); Marcelo Edral Pacheco, Rio de Janeiro (BR)

(73) Assignee: Petróleo Brasileiro S.A. - Petrobras, Rio de Janeiro (BR)

( * ) Notice: Subject to any disclaimer, the term of this patent is extended or adjusted under 35 U.S.C. 154(b) by 49 days.

(21) Appl. No.: 18/042,713

(22) PCT Filed: Aug. 20, 2021

(86) PCT No.: PCT/BR2021/050352
§ 371 (c)(1),
(2) Date: Feb. 23, 2023

(87) PCT Pub. No.: WO2022/040766
PCT Pub. Date: Mar. 3, 2022

(65) Prior Publication Data
US 2023/0332057 A1     Oct. 19, 2023

(30) Foreign Application Priority Data
Aug. 24, 2020   (BR) ...................... 10 2020 017281 6

(51) Int. Cl.
*C10G 47/18*   (2006.01)
*B01J 23/44*   (2006.01)
(Continued)

(52) U.S. Cl.
CPC .............. *C10G 47/18* (2013.01); *B01J 23/44* (2013.01); *B01J 29/7415* (2013.01);
(Continued)

(58) Field of Classification Search
CPC .... B01J 2229/20; B01J 2229/42; B01J 23/44; B01J 29/126; B01J 29/67; B01J 29/7415;
(Continued)

(56) References Cited

U.S. PATENT DOCUMENTS 3,700,585 A   10/1972  Chen et al.
3,849,290 A   11/1974  Wise et al.
(Continued)

FOREIGN PATENT DOCUMENTS

BR   102019027610 A2    5/2021
CN    105582991 A  *   5/2016
(Continued)

OTHER PUBLICATIONS

CN-105582991-A Translation (Year: 2016).*
(Continued)

*Primary Examiner* — Ellen M McAvoy
*Assistant Examiner* — Chantel Graham
(74) *Attorney, Agent, or Firm* — Mintz, Levin, Cohn, Ferris, Glovsky and Popeo, P.C.

(57) ABSTRACT

The present invention relates to a process for converting vegetable oils, animal fats, residual edible oils and carboxylic acids into renewable liquid fuels, such as bionaphtha, bioJET-A1 and renewable diesel, for use in a mixture with fossil fuels. The process consists of two steps: hydrotreating and hydrocracking. The effluent from the hydrotreatment step presents aromatics, olefins and compounds resulting from the polymerization of esters and acids in its composition. This fact occurs due to the use of partially reduced catalysts and without injection of sulfide agent and allows
(Continued)

obtaining a bioJET-A1 with adequate quality for use in a mixture with fossil kerosene. At the same time, the process generates, in addition to products in the distillation range of naphtha, kerosene and diesel, high molecular weight linear paraffins (with up to 40 carbon atoms).

14 Claims, 1 Drawing Sheet

(51) Int. Cl.
*B01J 29/74* (2006.01)
*B01J 35/50* (2024.01)
*C10G 3/00* (2006.01)
*C10G 69/12* (2006.01)

(52) U.S. Cl.
CPC ....... *B01J 29/7484* (2013.01); *B01J 29/7492* (2013.01); *B01J 35/50* (2024.01); *C10G 3/50* (2013.01); *C10G 69/126* (2013.01); *C10G 2300/1014* (2013.01); *C10G 2300/1018* (2013.01); *C10G 2300/1088* (2013.01); *C10G 2300/1096* (2013.01); *C10G 2400/08* (2013.01)

(58) Field of Classification Search
CPC .... B01J 29/7484; B01J 29/7492; B01J 29/85; B01J 37/0009; B01J 37/0201; B01J 37/18; B01J 35/50; C10G 2300/1011; C10G 2300/1014; C10G 2300/1018; C10G 2300/1088; C10G 2300/1096; C10G 2400/08; C10G 3/45; C10G 3/49; C10G 3/50; C10G 3/54; C10G 47/18; C10G 65/12; C10G 69/126; C12Q 1/686; C12Q 1/6886; C12Q 2600/118; C12Q 2600/158; C12Q 2600/178; G01N 2800/54; G01N 2800/56; G01N 2800/60; G01N 33/57415; G16B 20/00; Y02E 50/10; Y02P 30/20; Y02P 20/55; A61K 31/50; A61K 31/501; A61K 31/53; A61P 5/14; A61P 9/00; C07B 2200/13; C07D 237/14; C07D 237/16; C07D 403/02; C07D 403/12

See application file for complete search history.

(56) References Cited

U.S. PATENT DOCUMENTS

| | | | |
|---|---|---|---|
| 3,894,938 A | 7/1975 | Gorring et al. | |
| 3,950,241 A | 4/1976 | Bonacci et al. | |
| 4,032,431 A | 6/1977 | Weisz | |
| 4,141,859 A | 2/1979 | Plank et al. | |
| 4,176,050 A | 11/1979 | Chen et al. | |
| 4,181,598 A | 1/1980 | Gillespie et al. | |
| 4,222,855 A | 9/1980 | Pelrine et al. | |
| 4,229,282 A | 10/1980 | Peters et al. | |
| 4,247,388 A | 1/1981 | Banta et al. | |
| 4,310,440 A | 1/1982 | Wilson et al. | |
| 4,419,220 A | 12/1983 | Lapierre et al. | |
| 4,440,871 A | 4/1984 | Lok et al. | |
| 4,518,485 A | 5/1985 | Lapierre et al. | |
| 4,689,138 A | 8/1987 | Miller | |
| 4,710,485 A | 12/1987 | Miller | |
| 4,827,076 A | 5/1989 | Kokayeff et al. | |
| 4,855,530 A | 8/1989 | Lapierre et al. | |
| 4,877,581 A | 10/1989 | Chen et al. | |
| 4,913,791 A | 4/1990 | Hurd et al. | |
| 4,943,424 A | 7/1990 | Miller | |
| 5,087,347 A | 2/1992 | Miller | |
| 5,095,169 A | 3/1992 | Skeels et al. | |
| 5,158,665 A | 10/1992 | Miller | |
| 5,183,556 A | 2/1993 | Reilly et al. | |
| 5,208,005 A | 5/1993 | Miller | |
| 5,246,566 A | 9/1993 | Miller | |
| 5,444,032 A | 8/1995 | Perego et al. | |
| 5,767,038 A | 6/1998 | Perego et al. | |
| 8,067,657 B2 | 11/2011 | Duarte et al. | |
| 8,314,274 B2 | 11/2012 | Marker et al. | |
| 8,742,183 B2 | 6/2014 | Mccall et al. | |
| 2009/0158637 A1* | 6/2009 | McCall | C10G 45/02 44/308 |
| 2016/0289135 A1* | 10/2016 | Fichtl | C07C 5/277 |

FOREIGN PATENT DOCUMENTS

| | | | | |
|---|---|---|---|---|
| CN | 106281402 A | 1/2017 | | |
| FI | 933982 A | 9/1993 | | |
| WO | WO-2020083997 A1 * | 4/2020 | ............... | C10G 3/42 |

OTHER PUBLICATIONS

Arroyo et al. (Feb. 4, 2000) "Hydrocracking and Isomerization of n-paraffin mixtures and a hydrotreated Gasoil on Pt/ZSM-22: confirmation of pore mouth and key-lock catalysis in liquid phase", Applied Catalysis A: General, 192(1):9-22.

Cui et al. (Jun. 2015) "Controlling Acidic Sites to Improve Hydroisomerization Performance of Pt/SAPO-11 Catalysts", Catalysis Letters, 145(7):1464-1473.

Da Rocha Filho et al. (Apr. 1993) "Formation of Alkanes, Alkylcycloalkanes and Alkylbenzenes during the Catalytic Hydrocracking of Vegetable Oils", Fuel, 72(4):543-549.

Parmar et al. (Jan. 28, 2015) "Hydroisomerization of Long Chain n-Paraffins over Pt/ZSM-22: Influence of Si/Al Ratio", Energy Fuels, 29(2):1066-1075.

Reddy S.R. (Dec. 1986) "A thermodynamic model for predicting n-paraffin crystallization in diesel fuels", Fuel, 65(12):1647-1652.

Riazi et al. (Aug. 25, 1986) "Analytical Correlations interconvert Distillation Curve", Oil & Gas Journal, 84:50-57.

* cited by examiner

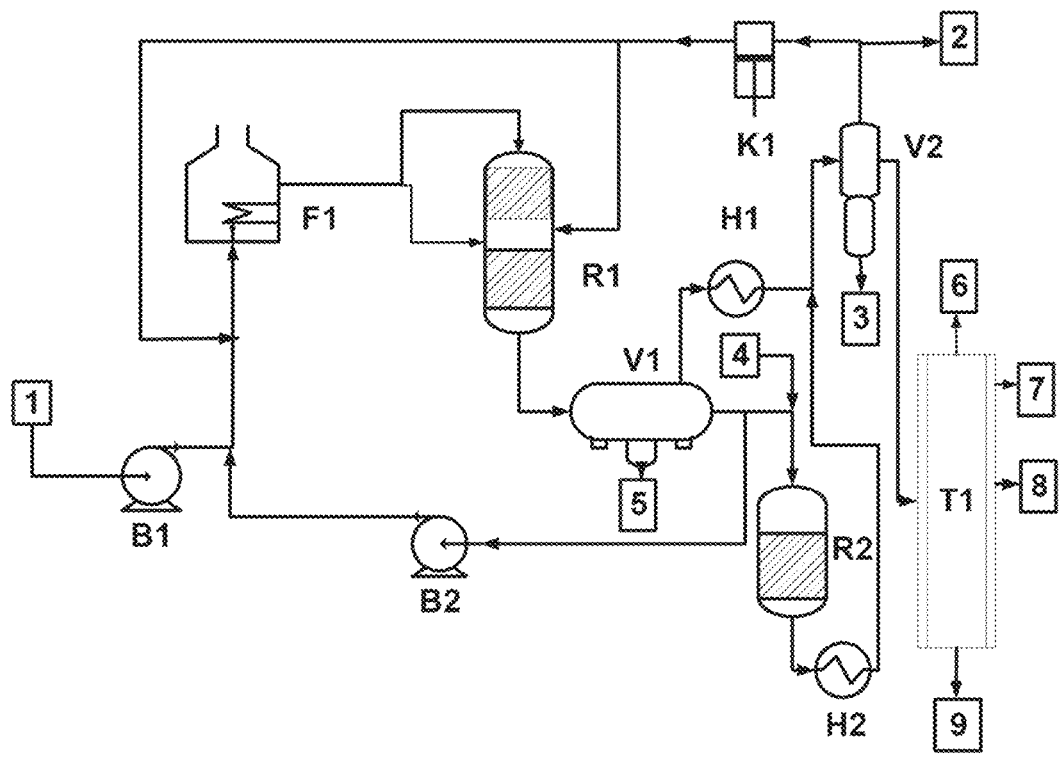

CATALYSTS AND SELECTIVE PROCESS FOR THE PRODUCTION OF RENEWABLE AVIATION FUELS AND BIOFUEL PRODUCED

CROSS-REFERENCE TO RELATED APPLICATIONS

This application is a national stage application, filed under 35 U.S.C. § 371, of PCT International Patent Application No. PCT/BR2021/050352, filed Aug. 20, 2021, and entitled "CATALYSTS AND SELECTIVE PROCESS FOR THE PRODUCTION OF RENEWABLE AVIATION FUELS AND BIOFUEL PRODUCED," and claims benefit of and priority to BR Application No. 10 2020 017281 6, filed Aug. 24, 2020, the disclosures of all of which are incorporated herein by reference in their entireties.

FIELD OF THE INVENTION

The present invention is related to a process for converting vegetable oils, animal fats, residual edible oils and carboxylic acids into renewable liquid fuels. More specifically, the catalysts and the process described provide an increase in the yield of products with the kerosene distillation range, with a specification according to ASTM 7566, that is, with adequate quality for use as aviation kerosene.

The present process performs the conversion of biomass in two stages, the first stage being described in document BR 102019027610-0. The second stage, object of the present invention, aims at converting paraffinic and olefinic compounds of high molecular weight, generated in the first stage, using selective catalysts for hydroisomerization, hydrocracking and hydrogenation reactions, with the objective of increasing the yield of products with a distillation curve in the kerosene range and reduce the freezing point to meet the specifications ASTM 7566 standard.

DESCRIPTION OF THE STATE OF THE ART

Air transport depends fundamentally on aviation kerosene (JET-A1). Therefore, the search for alternative sources has driven many research routes, and renewable sources have been of particular interest as they contribute to improving the environment and are particularly attractive for countries rich in agricultural and forestry resources.

To convert vegetable oils directly into extra quality diesel, a hydrorefining technology was developed, based on an already known technology, using existing commercial catalysts. The vegetable oils used were: canola oil, soybean oil and residual oil from cellulose production from pine trees (or any resinous plant). The used oils are of low quality, that is, they have not undergone any type of treatment, except filtration. The study resulted in the development of a new process for the hydrotreatment of pure vegetable oils, for the production of a hydrocarbon stream with a high cetane number, according to G. N. da Rocha Filho, D. Brodzki and G. Djega-Mariadassou—Formation of alkylcycloalkanes and alkylbenzenes during the catalytic hydrocracking of vegetable oils, Fuel, 72, pp. 543-549, 1993. Hydrocracking reactions are used to reduce the number of carbon atoms in the chain, hydrotreatment to remove oxygenated compounds and hydrogenation of unsaturations to remove double bonds; for that, commercial sulfide catalysts of NiMo and CoMo supported on gamma alumina were used.

U.S. Pat. No. 8,067,657 B2 teaches that paraffins with boiling points in the kerosene range can be obtained by properly selecting the vegetable oils to be processed, but they are oils that have a high market value and are produced in small quantities.

However, this solution cannot be fully adopted for the production of renewable aviation kerosene (bioJET-A1) due to the kerosene specifications presented in the ASTM D7566 standard, mainly with respect to the freezing point and the distillation curve.

To reduce the Freezing Point, U.S. Pat. No. 4,419,220 uses a catalyst containing beta zeolite impregnated with Pt and Pd for isomerization of C10+n-paraffins.

U.S. Pat. No. 4,518,485 uses ZSM-5 and ZSM-20 zeolites impregnated with group VIB and VIIIB metals to reduce the Clogging Point of a diesel stream.

A process scheme is presented in U.S. Pat. No. 4,913,791, where the diesel stream is treated in a first catalytic bed containing catalysts based on NiMo or CoMo sulfides and a second bed containing a hydroisomerization catalyst (beta zeolite).

A catalyst containing SAPO-11 is used in U.S. Pat. No. 4,877,581 to reduce the freezing point of a lubricant stream.

A mixture of n-paraffins, similar to the product obtained in the processing of vegetable oils, was used in U.S. Pat. No. 4,855,530 as a feedstock for hydroisomerization reactions, with a catalyst containing ZSM-12, ZSM-20 and ZSM-50.

Catalysts with dual functions, that is, removal of impurities and isomerization, made with non-crystalline molecular sieves SAPO and $AlPO_4$, were used in U.S. Pat. No. 4,827,076.

A series of hydroisomerization experiments using C16 n-paraffin feedstock was performed with catalysts based on $SiO_2/Al_2O_3$ and group VIIIB metals (U.S. Pat. No. 5,444,032, 5,767,038).

Therefore, catalysts containing molecular sieves, zeolitic or not, impregnated with reduced group VIIIB metal (Pt, Pd, etc.) and with high activity for hydroisomerization reactions and low activity for hydrocracking reactions, have been used both for production of lubricants and diesel oil.

In general, the renewable product of these processes contributes to the improvement of emissions presented by the diesel engine, and this improvement is inversely proportional to the quality of the base diesel fuel, that is, the worse the emission caused by the diesel, the better is the answer to the addition of the generated renewable paraffinic product, mainly with regard to the reduction of NOx and CO emissions.

However, this solution cannot be fully adopted for the production of renewable aviation kerosene (bioJET-A1), due to the specifications presented in the ASTM D7566 standard, mainly the properties that refer to the Freezing Point and the Distillation Curve.

To reduce the Freezing Point, U.S. Pat. No. 4,419,220 uses a catalyst containing beta zeolite impregnated with Pt and Pd for isomerization of C10+n-paraffins.

U.S. Pat. Nos. 5,246,566; 4,710,485 and 4,689,138 describe a method of producing lubricating oil, with a low clogging point, through the hydroisomerization of fossil paraffins using catalysts containing molecular sieves with one-dimensional pores, with opening between 5.4 and 7.0 A, such as: SAPO-11, SAPO-31, SAPO-41, ZSM-22, ZSM-23 and ZSM-35, impregnated with group VIIIB metal, operating at high $H_2$ pressures and temperatures.

Various ways of preparing silicoaluminaphosphate molecular sieves (SAPOs) are presented in U.S. Pat. Nos. 5,208,005; 5,158,665; 4,943,424; 4,440,871 and 4,310,440.

However, in the case of paraffins obtained from the hydroconversion of triacylglycerides, the compounds generated have chains with 15 to 20 carbon atoms (most of which contain chains in the range of 17 to 18 carbon atoms), whereas the most suitable compounds for aviation kerosene in relation to its boiling temperature are those found in the range between 9 to 14 carbon atoms. Therefore, selective cracking processes are required for chain size reduction and bioJET-A1 production.

The selective conversion of n-paraffins usually uses zeolites with a pore size that only allows the entry of linear and/or slightly branched paraffins, excluding polybranched ones, cyclic ones and aromatic compounds. The use of catalysts containing zeolites ZSM-5, ZSM-11, ZSM-12, ZSM-23, ZSM-35, etc. is mentioned in U.S. Pat. Nos. 3,700,585; 3,894,938; 4,176,050; 4,181,598; 4,222,855; 4,229,282; 4,247,388; 3,849,290; 3,950,241; 4,032,431 and 4,141,859, but these catalysts are very acidic and more selective for cracking reactions than for isomerization reactions.

PI Patent 933982 presents a renewable diesel production process through the conversion of the triacylglyceride stream. In a first stage, with the presence of hydrogen and alumina catalysts impregnated with NiMo or CoMo oxides, in the form of sulfides, the removal of oxygen atoms and the saturation of olefins occur. Therefore, the product is composed, almost entirely, of normal paraffins with 15 to 18 carbon atoms, that is, with a maximum chain length equal to or smaller than the acid radicals present in the feedstock, characterizing the non-occurrence of polymerization or oligomerization. In a second stage, the isomerization of the effluent stream from the first stage occurs, with catalysts containing SAPO-11 and ZSM-22 sieves impregnated with Pt.

U.S. Pat. No. 8,314,274 B2 proposes the feedstock conversion of triacylglycerides in two steps. In the first step, the hydrotreating process takes place, where a triacylglyceride stream diluted with a product recycle stream is treated in a fixed catalytic bed, composed of alumina impregnated with NiMo and CoMo sulfides. In the second step, after separating the products from the first step, the paraffin stream generated is converted into a selective catalyst bed for hydroisomerization. It should be noted that, under conditions of higher operating temperature, the product cracks and the yield of renewable diesel is reduced, with the generation of components in the boiling range of bioJET-A1 (IBP: 150° C. and FBP 300° C.) and naphtha, therefore not there is production of streams with a boiling point higher than that of JET-A1.

To increase the generation of bioJET-A1, U.S. Pat. No. 8,742,183 B2 proposes the addition of another stage, following the hydrotreatment and hydroisomerization steps, to promote the cracking of the isomers formed, through catalysts with more acidic supports, such as ZSM-5, Y zeolite and MOR. The liquid product of the hydrogenation and dehydroxygenation stage is composed of n-paraffins containing mostly 15 to 18 carbon atoms, and may contain small amounts of heavier paraffins, with up to 24 carbon atoms, depending on the type of feedstock used. This carbon number range is quite suitable, in terms of boiling point, to be added as a component of the diesel oil pool, as long as the low temperature flow properties can be improved (Clogging Point), which can be obtained by the mild hydroisomerization process, as the creation of a few branches in the chain is enough to provide a great reduction in the clogging point. However, for the production of aviation kerosene, the low temperature flow specifications are more severe and the most suitable range of carbons is from 9 to 16 atoms, demanding the need to selectively hydrocrack the stream in order to produce less naphtha, which it is a by-product of lesser value.

The cracking activity of SAPO-type molecular sieves can be changed, according to Xiao Cui et al., *Controlling Acidic Sites to Improve Hydroisomerization Performance of Pt/SAPO*-11 *Catalysts, Catal Lett.,* 2015 1464-1473, through variation of the $SiO_2/Al_2O_3$ ratio, which is of fundamental importance in the selectivity of SAPO-11-based catalysts. The increase in the $SiO_2/Al_2O_3$ ratio favors the formation of medium strength Bronsted acid sites (SM3), with the consequent reduction of weak acid sites (SM2), resulting in an increase in the cracking activity of the final catalyst.

Another method for producing acidic sites of the SM3 type is presented in U.S. Pat. No. 5,087,347. A similar effect is obtained by increasing the Si/Al ratio in the ZSM-22 zeolite, as taught by S. Parmar et al., *Hydroisomerization of Long Chain n-Paraffins, Energy Fuels,* 2015, 29, 1066-1075.

U.S. Pat. No. 5,095,169 proposes to improve the activity of beta zeolite through a chemical treatment, after the calcination step, to reduce the number of strong acidic sites.

The pore diameter of molecular sieves is also relevant for obtaining multiple branches in the normal paraffin chains, as taught by J. A. Muñoz Arroyo et al., *Hydrocracking and Isomerization of n-Paraffin on Pt/ZSM-*22, *Applied Catalysis A: general* 192 (2000) 9-22, which demonstrates that few tri- and di-branched compounds are obtained using Pt/ZSM-5, Pt/ZSM-22 and Pt/SAPO-11 catalysts, which have pore diameters (10 A) smaller than those of the Pt/Al-MCM-41 catalyst (pore diameter between 20 and 30 A), which presents an expressive formation of multi-branched compounds.

Patent CN106281402A proposes the conversion of feedstocks containing triacylglycerides in two steps. The first step is called hydrotreatment and aims at removing oxygen atoms and depolymerize the oil molecule, producing mainly propane, water, $CO_2$ and saturated hydrocarbons with chains of 15 to 18 carbon atoms.

The present invention differs substantially from the previously described by presenting a process composed of two steps: hydrotreatment (hydrodeoxygenation and polymerization) and isomerization. For the second step of conversion, a catalytic arrangement with gradations of activity is proposed to increase the selectivity for biokerosene production. Unlike existing technologies, the effluent from the hydrotreatment step (first step) has aromatics and some olefins in its composition. This fact occurs due to the use of partially reduced catalysts and without injection of sulfide agent.

SUMMARY OF THE INVENTION

In a broad way, the invention presents a process for the hydroconversion of vegetable oils comprising multiple catalytic stages.

In a first step, there is carried out the hydrotreatment of a stream containing triacylglycerides, fatty acid esters, pure or mixed with a stream of hydrocarbons obtained by recycling part of the generated product, using catalysts of metallic oxides of the VIB group, supported in materials with high specific area and high porosity, partially reduced, according to the Type 1 and Type 2 catalysts described in document BR 102019027610-0.

The second step, object of the present invention, aims at converting paraffinic and olefinic compounds of high molecular weight, using selective catalysts for hydroisomerization, hydrocracking and hydrogenation reactions, with the objective of increasing the yield of products with a distillation curve in the range of JET-A1 and reducing the freezing point in order to meet the specifications of the ASTM 7566 standard.

BRIEF DESCRIPTION OF THE DRAWINGS

FIG. 1 presents a possible basic scheme for the process of the present invention without, however, limiting it to this configuration. The proposed catalytic arrangement can be summarized in the use of two stages.

In FIG. 1, the process feedstock (1) is pumped by pump B1 and mixed with the recycle from pump B2. The feedstock is mixed with hydrogen from the recycle compressor K1. Part of the feedstock can be injected between the catalytic beds of the reactor R1, and the rest is heated in the heat exchanger batteries and in the furnace F1 and fed into the reactor inlet. Reactor R1 consists of several catalyst beds containing Type 1 and Type 2 catalysts, as described in BR 102019027610-0. The product from reactor R1 is sent to separator vessel V1 where the different phases are separated. The aqueous phase (5), rich in $CO_2$, can be directed to the refinery process water; the gaseous phase, consisting of light hydrocarbons, with the average boiling point of gasoline and unreacted hydrogen, is cooled and mixed with the cooled effluent from reactor R2. Part of the liquid hydrocarbon stream from V1 is mixed with replenishment hydrogen (4) and fed into reactor R2. Most of the stream is pumped by pump B2 to make up the dilution stream of the unit feedstock stream. The reactor R2, consisting of one or more beds of Type 3 catalysts, object of the present invention, is responsible for the generation of lower boiling point products. The effluent from reactor R2 is cooled, mixed with the gaseous stream separated from V1 and sent to phase separator V2. In separator V2, the gaseous stream rich in $H_2$ is recycled to reactor R1 and the hydrocarbon stream (3) is sent to distillation tower Ti, where there are separated: a light stream (6), rich in C3 and C4 olefins; a stream in the gasoline distillation range (7), rich in isomers and olefins; a stream (8) in the bioJET-A1 distillation range and that meets the specifications of ASTM 7655 standard; and the stream (9) in the diesel distillation range. The stream (10), heavier than diesel, can be recycled to reactor R2 to be converted or processed into HCC units.

DESCRIPTION OF THE INVENTION

The process presents a solution to increase the yield of renewable kerosene (bioJET-A1) from paraffinic streams derived from biomass. The current process describes the conversion of the product generated by processing vegetable oils, animal fats, residual edible oils and carboxylic acids, as described in BR 102019027610-0, into renewable kerosene that meets the specifications of ASTM 7566 standard. In a broad way, the process of this invention proposes the conversion of biomass in two stages.

In the first stage of the process, a feedstock consisting of triacylglycerides, in the ratio between 1 and 75% by mass, and hydrocarbons, from the recycling of part of the generated product, in the ratio of 99 to 25% in mass, is hydrotreated. It should be noted that the cargo cannot contain any sulfur compounds ($H_2S$, DMDS, etc.). The composite feedstock, after injecting a stream of hydrogen, is directed to the reactor where the hydrodeoxygenation reactions take place, in the presence of a partially reduced catalyst and without the addition of sulfide compounds. The hydrotreatment conditions are: operating pressure from 4 MPa to 10 MPa, average temperature of the catalytic bed between 320° C. and 400° C., space velocity from 0.5 $h^{-1}$ to 2 $h^{-1}$ and hydrogen: feedstock ratio ranging from 200 NL of hydrogen/liter of feedstock to 1000 NL of hydrogen/liter of feedstock.

In the first stage, one or more reactors containing at least one catalyst bed of group VIB metal oxide catalyst, partially reduced, supported on materials with high specific area and low cracking activity (Type 1 catalyst, as described in document BR 102019027610-0). This catalytic system favors hydrodeoxygenation and polymerization/oligomerization reactions. The Type 1 catalyst beds may or may not be followed by other catalyst beds containing metal oxide catalysts from group VIB and VIIIB (e.g.: NiMo, NiW), partially reduced, supported on materials with high specific area and acidity, in order to promote cracking reactions (Type 2 catalyst, as described in document BR 102019027610-0). The operating conditions, mainly the reaction temperature, are adjusted so that the products formed in this first stage have molecules with a carbon number of 19, which corresponds to the final boiling point (ASTM 2887 analysis) of approximately 320° C. Therefore, to obtain products in the distillation range characteristic of bioJET-A1 (ASTM 7566) and renewable diesel, the final stream of the process needs to be distilled.

The produced renewable hydrocarbon stream has a different composition from those produced in similar processes because it contains olefinic and aromatic compounds, in addition to normal paraffins. In the bioJET-A1 stream, the high concentration of olefins leads to low oxidation stability, and the high concentration of normal paraffins implies a high freezing point, making its use unfeasible as a fuel according to the specifications of the ASTM 7566 standard. Thus, the distillate cut needs to be hydrogenated to reduce the concentration of olefins and aromatics; however, to frame the freezing point at values below −40° C., the stream needs to be isomerized to generate branched aliphatic compounds. These reactions occur in the second stage of the process, which is the object of the present invention.

Due to the absence of contaminants, such as organosulfur compounds, the bioJET-A1 cut generated in the first stage can be sent to the second stage without the need for purification processes.

The second stage of conversion, responsible for increasing the yield of bioJET-A1, is characterized by using multiple catalyst beds, preferably from three to five, whose catalysts have different chemical and physical characteristics.

The second stage catalyst beds are composed of group VIIIB metal oxide catalysts (Type 3 catalyst), mainly platinum, in concentrations of 0.1 to 1.0% in mass, preferably between 0.3 and 0.5% in mass, completely reduced under process conditions and not showing compounds with different oxidation states as occurs with first stage catalysts (Type 1 and Type 2 catalysts).

The second stage catalyst beds should show a gradation in hydrocracking activity. The first catalytic bed has high activity for hydroisomerization reactions and low activity for hydrocracking reactions. The other beds should show a progressive increase in hydrocracking activity. The gradation of activity is obtained through the selection of supports containing molecular sieves, such as SAPO-11, SAPO-31 and SAPO-41, recommended for the initial bed, or as zeolites: Beta, ZSM-22, ZSM-23 and ZSM-35 for subsequent beds. These catalysts should be prepared in the form of particles with an equivalent diameter of 1 mm to 5 mm.

The molecular sieve content in the catalyst particle may vary from 20% to 70% in mass, preferably from 30% to 50% in mass, for a more precise adjustment of the catalyst activity.

The activity of molecular sieves is a function of the strength of the acidic active sites and can be controlled by varying the Si/Al ratio (SAR) present on the catalyst support. Different Si/Al ratios can be adjusted depending on the binder used, which may be gamma-alumina, silica, clays or kaolin, but not limited to these compounds.

The different catalysts of the second stage of conversion can operate under the same operating conditions or under different conditions, mainly with reduced pressure and/or increased temperature, in order to favor hydrocracking reactions. The operating conditions are: pressure from 3 MPa to 8 MPa; average temperature of the catalytic bed between 240° C. and 380° C. and hydrogen/feedstock ratio between 100 and 600 NL $H_2$/L of feedstock.

Based on the knowledge presented, it is ascertained that a possible sequence for the arrangement of the second stage catalytic beds, without restriction to other arrangements, aiming at increasing the selectivity for the production of bioJET-A1, from a stream containing n-paraffins, olefins and aromatics (according to the effluent stream of the first stage of conversion) is: a first catalytic bed with the function of promoting mono branching and with low cracking activity, composed of Pt supported on SAPO-11, ZSM-22 with low Si/Al ratio or Beta zeolite passivated with organic acids; a second catalytic bed aiming at increasing the number of branches, composed of Pt supported on mesoporous sieves (e.g.: Pt/MCM-41); a third catalytic bed designed to promote small cracking and increased isomerization, composed of Pt catalyst with low acidity (e.g., Pt/ZSM-22) and a fourth catalytic bed to promote moderate cracking with some isomerization, composed of Pt catalyst Pt with medium acidity (e.g., Pt/Beta Zeolite).

For a better use of the characteristics of the various formulations of catalysts, a two-stage process scheme is proposed, without, however, limiting the same to this configuration.

In the first stage of the conversion, a Type 1 catalyst is used (as described in BR 102019027610-0), active for hydrodeoxygenation and polymerization reactions, with the formation of hydrocarbons with carbon chains longer than those present in the feedstock, composed of group VIB metal oxides, mainly Mo and W, supported on materials with a high specific area and high porosity, one of the most used materials being γ-alumina (γ-$Al_2O_3$) with a specific area between 200 and 400 $m^2$/g and pore volume from 0.5 to 1.0 $cm^3$/g. In addition to providing a high specific area, in which the active components are dispersed in the form of small particles, the support provides mechanical strength and thermal stability, preventing the sintering of the catalyst inside the reactor.

Still in the first stage of the conversion, it is optional to use a Type 2 catalyst (as described in BR 102019027610-0), composed of metal oxides of groups VIB and VIIIB (preferably Ni), which are usually bimetallic in the form of metal oxides (Ni—Mo, Co—Mo, Co—W and Ni—W) deposited on a support with acidic properties and active for hydrocracking reactions, such as zeolite-type molecular sieves, preferably Beta zeolite, ZSM-22, Y zeolite, etc. The function of the Type 2 catalyst is to increase the efficiency of the stream with the boiling point of the bioJET-A1 (Final Boiling Point (FBP)=300° C.).

The Type 1 catalyst promotes the removal of oxygen atoms, preserves the unsaturation present in the feedstock and catalyzes polymerization reactions, which results in products with molecules containing a greater number of carbon atoms than the carboxylic acids present in the feedstock.

Between the first and second stages, there may be, optionally, a separation of gaseous products, with the aim of recovering the light olefinic products (of greater commercial value) and the generated water.

The second stage of the process uses at least one bed of Type 3 catalyst to promote the other hydroconversion reactions. This is the fundamental step of the invention, where it is demonstrated that greater yields of renewable kerosene are obtained through an arrangement containing multiple catalytic beds, preferably from 3 to 5 beds, with different chemical and physical characteristics, so that the first catalytic bed should present a high activity for hydroisomerization reactions and low activity for hydrocracking reactions. The following catalyst beds should show a progressive increase in hydrocracking activity.

FIG. 1 presents a basic scheme of the process for better use of the characteristics of the various formulations of catalysts, without, however, limiting the same to this configuration.

In FIG. 1, the process feedstock (1), composed of carboxylic acids, esters (triacylglycerides) of vegetable oils and animal fats, etc. is pumped by pump B1 and mixed with the recycle from pump B2. The recycle stream aims at reducing the temperature of reactor R1 due to the exothermicity of the reaction. The dilution volumetric ratio is 2 to 10 (diluent/feedstock), preferably 3 to 6. The composite feedstock is mixed with hydrogen from the recycle compressor K1. The ratio between the hydrogen flow and the combined feedstock is 200 to 800 $Nm^3/m^3$, preferably 300 to 500 $Nm^3/m^3$. Part of the feedstock can be injected between the catalytic beds of the reactor R1, and the rest is heated in the heat exchanger batteries and in the furnace F1 and fed into the reactor inlet. The reactor R1 is divided into several beds containing Type 1 and Type 2 catalysts and, in order to control the reactor outlet temperature, hydrogen streams and/or a liquid stream are injected between beds. The average temperature of reactor R1 ranges from 300 to 400° C., preferably from 320 to 360° C. The product from reactor R1 is sent to separator vessel V1, where the different phases are separated. The aqueous phase (5), rich in $CO_2$, can be directed to the refinery process water; the gaseous phase, composed of light hydrocarbons, with the average boiling point of gasoline and unreacted hydrogen, is cooled and mixed with the cooled effluent from reactor R2. The liquid hydrocarbon stream from V1 is mixed with replenishment hydrogen (4) and fed into reactor R2, with most of the stream being pumped by pump B2 to make up the unit feedstock dilution stream. The reactor R2, consisting of one or more beds of Type 3 catalysts, is responsible for generating lower boiling point products. The effluent from reactor R2 is cooled, mixed with the gaseous stream separated from V1 and sent to phase separator V2. In separator V2, the gaseous stream rich in $H_2$ is recycled to reactor R1 and the hydrocarbon stream (3) is sent to the distillation tower Ti, where the lighter stream (6), rich in C3 and C4 olefins, can be sent to the gas recovery unit of the FCC unit, or sold directly. The stream (7) is composed of gasoline rich in isomers and olefins. The stream (8) is bioJET-A1 distillation range and meets the specifications of the ASTM 7655 standard. Stream (9) consists of renewable diesel that can be added directly to the diesel pool.

EXAMPLES

In the tests carried out to determine the yields of bioJET-A1, a reactor with a volume of 5 $cm^3$ was used, containing Type 1 catalyst (transition metal oxide, partially reduced and supported on porous solid of low acidity), operating isothermally. As feedstock, vegetable oil (tests 1 and 2) and animal fat (tests 3 and 4) were used. After processing, the gaseous stream, containing $CH_4$, $CO_2$ and $C3H_8$, and the water were separated and the stream composed of saturated and olefinic hydrocarbons was used to prove the proposed innovation in the production of bioJET-A1. The liquid product was cooled and analyzed by gas chromatography coupled with a mass spectrometry detector (GC-MS) to identify the compounds. A capillary column model AC210173.038 measuring 40.0 m×100 μm×0.20 μm was used. The distillation curve of the product was determined from the boiling point of normal paraffins in a similar way to the methodology used in the ASTM 2887 standard for determining the simulated distillation curve. The points of the ASTM D86 distillation curve, as required by the ASTM 7566 standard, were estimated from the simulated distillation curve obtained and converted through the correlations presented in "Analytical Correlations Interconvert Distillation Curve Types", Oil&Gas Journal, vol 84, 1986, August 25, pp 50-57. The typical composition of the generated liquid streams, for soy oil and animal fat feedstocks, are shown in Table 1.

TABLE 1

|  |  | Test 1 | Test 2 | Test 3 | Test 4 |
| --- | --- | --- | --- | --- | --- |
| Feedstock |  | Soybean oil | Soybean oil | Fat | Fat |
| Pressure | MPa | 60 | 60 | 60 | 40 |
| Temp | °C. | 350 | 355 | 330 | 330 |
| H2feedstock | $Nm^3/m^3$ | 607 | 600 | 562 | 601 |
| WHSV | $h^{-1}$ | 1.50 | 0.80 | 1.50 | 1.50 |
| ASTM 2887- (% mass) |  |  |  |  |  |
| IBP |  | 193.2 | 190.6 | 195.4 | 196.4 |
| 10 |  | 291.4 | 284.6 | 283.4 | 282.8 |
| 30 |  | 313.6 | 306.6 | 294.2 | 298.2 |
| 50 |  | 346.8 | 315.8 | 315.0 | 314.4 |
| 70 |  | 485.4 | 330.0 | 319.2 | 318.0 |
| 90 |  | 550.2 | 486.6 | 462.2 | 488.0 |
| FBP |  | 610.2 | 601.2 | 580.4 | 598.4 |
| % JET-A1 | 150-300 | 14 | 20 | 31 | 29 |
| % Diesel | 300-350 | 34 | 47 | 50 | 44 |
| % Light oil | 350-450 | 13 | 6 | 3 | 5 |
| % Heavy oil | 450+ | 33.0 | 17.3 | 10.3 | 16.0 |
| % Olefins JET-A1 |  | 81.8 | 68.2 | 34.4 | 37.2 |
| % n-paraffin JET-A1 |  | 18.2 | 31.8 | 65.6 | 62.8 |
| % Olefins diesel |  | 63.6 | 51.1 | 22.1 | 33.1 |
| % n-paraffin diesel |  | 36.4 | 48.9 | 77.9 | 66.9 |

To evaluate the catalytic activity of the second stage of conversion, the product of test 2 in Table 1 was used. The chromatographic analysis of this stream (without the heavy oil, which was not analyzed due to the limitations of the employed chromatographic method) is presented in Table 2, highlighting the relevant amounts of olefinic and aromatic compounds, characteristic of the first stage of conversion.

TABLE 2

| No. of carbons | n-Paraffins (% mass) | iso-Paraffins (% mass) | Olefins (% mass) | Alkyl-aromatics (% mass) |
| --- | --- | --- | --- | --- |
| C11 | 0.0 | 0.0 | 0.0 | 0.0 |
| C12 | 0.0 | 0.0 | 0.0 | 0.0 |
| C13 | 0.1 | 0.0 | 0.1 | 0.0 |
| C14 | 0.2 | 0.1 | 0.2 | 0.1 |
| C15 | 0.9 | 0.2 | 0.4 | 0.1 |
| C16 | 8.9 | 0.6 | 2.6 | 0.1 |
| C17 | 7.6 | 1.3 | 1.8 | 0.0 |
| C18 | 33.7 | 6.5 | 20.4 | 1.2 |
| C19 | 0.5 | 0.3 | 7.7 | 0.7 |
| C20 | 0.8 | 0.3 | 1.5 | 0.1 |
| C21 | 0.2 | 0.2 | 0.6 | 0.0 |
| C22 | 0.1 | 0.0 | 0.1 | 0.0 |
| C23 | 0.0 | 0.0 | 0.0 | 0.0 |
| C24 | 0.0 | 0.0 | 0.0 | 0.0 |

The liquid effluent from the tests presented in Examples 1 to 3, to evaluate the catalytic activity of the second stage of conversion, was cooled and analyzed by gas chromatography coupled with a mass spectrometry detector (GC-MS) to identify the composition. A capillary column model AC210173.038 measuring 40.0 m×100 μm×0.20 μm was used. The distillation curve of the product was determined from the boiling point of n-paraffins, similarly to the methodology used in the ASTM 2887 standard for the determination of the simulated distillation curve. The freezing point was calculated based on thermodynamic calculations adjusted to experimental data, as taught by Reddy, S. R.; Fuel, 1986, December, 1647-1652—"*A thermodynamic model for predicting n-paraffin crystallization in diesel fuels*". The points of the ASTM D86 distillation curve, as determined by the ASTM 7566 standard, were estimated from the simulated distillation curve obtained and converted through the correlations presented in "*Analytical Correlations Interconvert Distillation Curve Types*", Oil&Gas Journal, vol 84, 1986, August 25, pp 50-57. The distillation curve of the product was obtained from the additivity of the distillation point of the pure compounds weighted by the inverse of their respective mass fraction.

Example 1

Test with CAT1 (Type 3): the support was prepared with 50% m of aluminosilicophosphate SAPO-11 and 50% m of gamma alumina, in cylindrical particles with about 1.3 mm in diameter. The support was dried at 120° C. for approximately 16 hours and calcined for 3 hours at a temperature of 550° C. The calcined particles were impregnated with a solution of tetraaminplatin chloride ($Pt(NH_3)_4Cl_2$), using the wet spot technique (0.5% in mass of Pt), and subsequently dried at 110° C. for 16 hours and calcined at 200° C. for 1 hour. The SAPO-11 molecular sieve was produced using the methodology compatible with those found in the literature, and its characterization through physicochemical methods presented structural and textural properties in accordance with those expected according to the reference http://izasc-mirror.la.asu.edu/fmi/xsl/IZA-SC/ft.xsl.

The reactor was loaded with the CAT1 catalyst (Type 3) and had the temperature raised to 400° C., with hydrogen flow, to reduce platinum (Pt). After reducing the temperature to the test condition, the feedstock of n-paraffins (from test 2 in Table 1) was injected. The tests were performed with temperature variation and WHSV=1.4 $h^{-1}$; H2/feedstock=615 NL/L and pressure=6 MPa. The JET-A1 yield was determined by the final boiling point of 300° C. and the initial boiling point compatible with the calculated flash point. The test results are shown in Table 3.

TABLE 3

|  | Units | ASTM Specification 7566 a3 | Test 1 | Test 2 | Test 3 |
|---|---|---|---|---|---|
| Product yields | | | | | |
| Temperature | ° C. | | 320 | 340 | 360 |
| % naphtha | % vol | | 0.12 | 1.9 | 4.5 |
| % JET-A1 | % vol | | 4.0 | 9.6 | 37.5 |
| % diesel | % vol | | 96.3 | 89.2 | 59.7 |
| JET-A1 cut properties | | | | | |
| Freezing point | ° C. | −40 | −35.1 | −46.3 | −67 |
| Distillation (ASTM D86) | | | | | |
| T10 | ° C. | 205 max. | 165.2 | 148.8 | 140.6 |
| T50 | ° C. | | 234.9 | 234.1 | 227.8 |
| T90 | ° C. | | 281.7 | 272.6 | 280.2 |
| FBP | ° C. | 300 max. | 300.0 | 300.0 | 300.0 |
| T90-T10 | ° C. | 22 min. | 115.3 | 120.2 | 145.4 |
| Density @ 15° C. | | 0.730/0.770 | 0.7526 | 0.7530 | 0.7507 |
| Flash point | ° C. | 38 | 52.4 | 40.8 | 38.0 |

Upon analyzing the results of Table 3, it appears that CAT1 (Type 3) has a low yield in the kerosene distillation range, although this cut presents a freezing point that is much lower than that specified by the ASTM standard. However, for tests with low conversions (Test 1), the freezing point is higher than specified.

Example 2

Test with CAT2 (Type 3): the support was prepared with 30 om of Beta zeolite and 70 om of gamma alumina, in cylindrical particles with about 1.3 mm in diameter. The support was dried at 120° C. for approximately 16 hours and calcined for 3 hours at a temperature of 550° C. The calcined particles were impregnated with a solution of tetraaminplatin chloride (Pt(NH$_3$)$_4$Cl$_2$), using the wet spot technique (0.5% in mass of Pt), and subsequently dried at 110° C. for 16 hours and calcined at 200° C. for 1 hour. Beta zeolite was produced using methodology compatible with those found in the literature and its characterization, through physical-chemical methods, presented results compatible with those expected according to the reference http://izasc-mirror.la.asu.edu/fmi/xsl/IZA-SC/ft.xsl.

The reactor was loaded with a bed of CAT2 catalyst (Type 3) and had the temperature elevated, with hydrogen flow, up to 400° C. for the reduction of platinum (Pt). After reducing the temperature to the test condition, the feedstock of n-paraffins (from test 2 in Table 1) was injected. The tests were performed with temperature variation and keeping the following parameters fixed: WHSV=1.9 h$^{-1}$; H2/feedstock=710 NL/L and pressure=7.5 MPa. The JET-A1 yield was determined by the final boiling point of 300° C. and the initial boiling point compatible with the calculated flash point. The test results are shown in Table 4.

TABLE 4

|  | Units | ASTM Specification 7566 a3 | Test 1 | Test 2 | Test 3 |
|---|---|---|---|---|---|
| Product yields | | | | | |
| Temperature | ° C. | | 300 | 310 | 320 |
| % naphtha | % vol | | 6.8 | 13.5 | 42.6 |
| % JET-A1 | % vol | | 16.4 | 22.4 | 65.8 |
| % diesel | % vol | | 78.5 | 67.1 | 0.0 |
| JET-A1 cut properties | | | | | |
| Freezing point | ° C. | −40 | −48.3 | −49.3 | −38.5 |
| Distillation (ASTM D86) | | | | | |
| T10 | ° C. | 205 max. | 147.0 | 148.9 | 148.3 |
| T50 | ° C. | | 229.7 | 226.6 | 208.6 |
| T90 | ° C. | | 281.0 | 278.1 | 282.5 |
| FBP | ° C. | 300 max. | 300.0 | 300.0 | 300.0 |
| T90-T10 | ° C. | 22 min. | 138.2 | 134.5 | 157.7 |
| Density @ 15° C. | | 0.730/0.770 | 0.7500 | 0.7529 | 0.7521 |
| Flash point | ° C. | 38 | 39.5 | 40.9 | 40.5 |

Upon analyzing the results in Table 4, it appears that CAT2 has a high yield in the kerosene distillation range with a freezing point lower than that specified by ASTM 7566 standard. However, it is observed that there was an excessive increase in naphtha formation and decrease in the yield of diesel oil when compared to the yields obtained with CAT1 (Example 1).

Example 3

The reactor was loaded with two catalytic beds: the first containing 75% in mass of CAT1 and the second containing 25% in mass of CAT2 and had its temperature raised to 400° C. for reduction of platinum (Pt). After reducing the temperature to the test condition, the feedstock of n-paraffins (from test 2 in Table 1) was injected. The tests were performed with temperature variation and keeping the following parameters fixed: WHSV=1.8 h$^{-1}$; H$_2$/feedstock=700 NL/L and pressure=6.0 MPa. The JET-A1 yield was determined by the final boiling point of 300° C. and the initial boiling point compatible with the calculated flash point. The test results are shown in Table 5.

TABLE 5

|  | Units | ASTM Specification 7566 a3 | Test 1 | Test 2 |
|---|---|---|---|---|
| Temperature | ° C. | | 340 | 360 |
| % naphtha | % vol | | 1.4 | 4.3 |
| % JET-A1 | % vol | | 10.5 | 51.1 |
| % diesel | % vol | | 88.7 | 46.8 |
| JET-A1 cut properties | | | | |
| Freezing point | ° C. | −40 | −46.4 | −54.2 |
| Distillation (ASTM D86) | | | | |
| T10 | ° C. | 205 max. | 148.7 | 152.1 |
| T50 | ° C. | | 231.9 | 217.3 |
| T90 | ° C. | | 279.7 | 283.8 |
| FBP | ° C. | 300 max. | 300.0 | 300.0 |
| T90-T10 | ° C. | 22 min. | 132.4 | 147.7 |
| Density @ 15° C. | | 0.730/0.770 | 0.7521 | 0.7538 |
| Flash point | ° C. | 38 | 40.8 | 43.1 |

Upon analyzing the results in Table 5, it is ascertained that the combination of CAT1 and CAT2 results in high product yield in the kerosene distillation range, with a freezing point lower than that specified by ASTM 7566 and with low naphtha yield. The kerosene yield obtained in test 2 of Table 5 exceeds the values obtained with the catalysts separately, as can be seen by comparing the best kerosene yields to the same (approximate) naphtha yield shown in Table 3 (Test 3) and in Table 4 (Test 1). These results demonstrate the advantage of using the combination of catalysts proposed in this invention to increase the yield of renewable kerosene, with cold flow properties (freezing point) suitable for use as aviation fuel.

The invention claimed is:

1. A selection process for production of renewable aviation fuels, the process comprising:
    selecting a renewable feedstock of a first stage from among vegetable oils, animal fats, residual edible oils, or acids;
    hydrodeoxygenating and polymerizing the renewable feedstock in a first stage, with formation of hydrocarbons with longer carbon chains than those present in the renewable feedstock;
    directing effluent from the first stage, containing n-paraffins, olefins and aromatics and free of organosulfurates, to a second stage of reaction, without purification to eliminate contaminants;
    hydroisomerizing and hydrocracking within second stage with multiple catalytic beds, for hydroisomerization and hydrocracking reactions, whose catalysts have different chemical and physical characteristics; and
    sending recycle gas, rich in hydrogen, from the second stage to the first stage, without treatment in amine units to remove contaminants,
    wherein the catalytic beds of the second stage show gradation of activity,
    wherein operating conditions of the second stage are: pressure in a range of 3 MPa to 8 MPa, average temperature of the catalytic bed between 240° C. and 380° C. and hydrogen/feedstock ratio between 100 and 600 NL $H_2$/L of feedstock, and
    wherein the operating conditions of the second stage may be the same or different from those of the first stage.

2. The process according to claim 1, further comprising:
    mixing the renewable feedstock stream with a recycled product stream from a first separator vessel and receiving, by the renewable feedstock stream, an injection of recycle gas, rich in hydrogen;
    heating and directing a fraction of the renewable feedstock and recycle gas is to an inlet of a first stage reactor;
    directing a fraction of unheated composite feedstock and recycle gas is directed to a region between the catalytic beds of the first stage reactor, to control a reactor temperature;
    directing effluent from the first stage reactor to the first separator vessel where an aqueous phase, a gaseous phase, composed of light hydrocarbons, and a liquid phase are separated;
    returning a fraction of the liquid phase from the separator is returned to a beginning of the process to dilute the composite feedstock;
    mixing another fraction of the liquid phase from the separator with the recycle gas rich in hydrogen and directing the mixture to a second stage reactor, located downstream the first stage reactor;
    sending effluent from the second stage reactor to a second separator vessel, from where the recycle gas rich in hydrogen is recycled directly to the first stage reactor; and
    directing the liquid stream from the second separator vessel to a distillation tower where a lighter stream, a gasoline stream, a stream of bioJET, and a stream of renewable diesel are separated, the lighter stream comprising olefins with 3 to 4 carbon atoms, the stream of gasoline comprising isomers and olefins, and the stream of bioJET-A1 meets the standard of ASTM 7655.

3. The process according to claim 2, wherein the vegetable oil is selected from the group consisting of: castor, soy, canola, peanut, palm, and babassu oil, pure or mixed in any ratio.

4. The process according to claim 2, wherein the renewable feedstock comprises animal fat of any origin.

5. The process according to claim 4, wherein the feedstock is a mixture of vegetable oil and animal fat in any ratio.

6. The process according to claim 2, wherein a first catalytic bed of the second stage reactor comprises a catalyst with high activity for hydroisomerization reactions and low activity for hydrocracking reactions and subsequent beds comprising catalysts of hydrocracking, with a progressive increase in activity.

7. Catalysts for the production of renewable aviation fuels, used in the second stage of the process described in claim 1, wherein:
    the catalysts comprise group VIIIB metal oxides (Type 3 catalyst), mainly platinum, in concentrations of 0.1 to 1.0% in mass, preferably between 0.3 and 0.5% in mass, completely reduced in the process conditions and not presenting compounds with different oxidation states, as occurs with first stage catalysts;
    a first catalyst bed has high activity for hydroisomerization reactions and low activity for hydrocracking reactions;
    the other beds show a progressive increase in hydrocracking activity;
    the gradation of hydrocracking activity is obtained through the selection of supports containing molecular sieves; and
    the molecular sieve content in the catalyst particle is in a range of 20% to 70% in mass.

8. The catalysts for the second stage according to claim 7, wherein the catalyst support of the first catalyst bed is a molecular sieve selected from the group formed by SAPO-11, SAPO-31, and SAPO-41.

9. The catalysts for the second stage according to claim 7, wherein the support of the subsequent beds are zeolite-type molecular sieves, selected from the group formed by Beta zeolite, Y zeolite, ZSM-22, ZSM-23, and ZSM-35.

10. The catalysts for the second stage according to claim 7, wherein the support of the subsequent beds are Beta zeolite, ZSM-22, ZSM-23, and ZSM-35.

11. The catalysts for the second stage according to claim 7, wherein the molecular sieve content in the catalyst particle is 30% to 50% in mass.

12. The catalysts for the second stage according to claim 7, wherein they are prepared as particles with an equivalent diameter of 1 mm to 5 mm.

13. A biofuel produced according to the process of claim 1, wherein the biofuel is a stream specified as bioJET-A1, in accordance with ASTM 7655 standard.

14. A selection process for production of renewable aviation fuels, the process comprising:
- selecting a renewable feedstock of a first stage from among vegetable oils, animal fats, residual edible oils, or acids;
- hydrodeoxygenating and polymerizing the renewable feedstock in a first stage, with formation of hydrocarbons with longer carbon chains than those present in the renewable feedstock;
- directing effluent from the first stage, containing n-paraffins, olefins and aromatics and free of organosulfurates, to a second stage of reaction, without purification to eliminate contaminants; and
- hydroisomerizing and hydrocracking within a single reactor in the second stage with multiple catalytic beds, for hydroisomerization and hydrocracking reactions, whose catalysts have different chemical and physical characteristics,
- wherein the catalytic beds of the second stage show gradation of activity,
- wherein operating conditions of the second stage are: pressure in a range of 3 MPa to 8 MPa, average temperature of the catalytic bed between 240° C. and 380° C. and hydrogen/feedstock ratio between 100 and 600 NL $H_2$/L of feedstock, and
- wherein the operating conditions of the second stage may be the same or different from those of the first stage.

\* \* \* \* \*